UNITED STATES PATENT OFFICE.

STUART P. MILLER, OF PHILADELPHIA, PENNSYLVANIA, ASSIGNOR TO THE BARRETT COMPANY, A CORPORATION OF NEW JERSEY.

METHOD OF PREPARING RESIN.

1,395,968.   Specification of Letters Patent.   Patented Nov. 1, 1921.

No Drawing.   Application filed December 24, 1920. Serial No. 432,968.

*To all whom it may concern:*

Be it known that I, STUART P. MILLER, a citizen of the United States, residing at Philadelphia, in the county of Philadelphia and State of Pennsylvania, have invented certain new and useful Improvements in Methods of Preparing Resin, of which the following is a specification.

This invention relates to the preparation of resins from naphthas containing polymerizable constituents, such as coumarone, indene, etc., and has for its object to produce such resins in a rapid and economical manner and in a more nearly pure state than has been obtained in the usual processes.

It is well known that when a naphtha containing coumarone or indene is treated with sulfuric acid the coumarone and indene are polymerized. When the naphtha containing the polymerized coumarone and indene in solution is separated from the polymerizing acid, neutralized with a solution of an alkali, separated from the alkaline solution, washed, and distilled to remove unpolymerized material, the polymerized coumarone and indene remain behind in the still as a liquid which solidifies to a resin on cooling. This reason is commonly known as paracoumarone or paraindene.

The naphtha after the polymerization with sulfuric acid retains in suspension a small amount of sulfuric acid and of the sulfonic acids formed by the reaction of some of the polymerizing acid upon certain of the constituents of the naphtha. Before this polymerized naphtha can be satisfactorily distilled to recover the resins, these last traces of acid must be neutralized by agitating the naphtha with a solution of an alkali, as for example, sodium hydroxid. If this neutralization step is omitted the small amounts of acid retained by the naphtha will cause the resin obtained by the distillation of the naphtha to be very dark in color and to be less valuable for many of the purposes for which it is used in the arts.

After the neutralization of the naphtha the major portion of the alkaline solution (containing small amounts of alkali sulfates and sulfonates) separates readily from the naphtha, and may be drawn off. A small amount of the alkaline solution and salts, however, remains suspended in the oil and cannot be separated by allowing the oil to stand for any economically practicable length of time. The previously described and commonly used method of removing the small amounts of alkali and alkali salts retained in the oil by the formation of this above described suspension is to agitate the neutralized oil with successive portions of water, settling and removing each successive portion of wash water, until the ash content of the oil is sufficiently reduced. If this washing with water is omitted, the resin obtained after distilling off the volatile constituents of the naphtha will contain appreciable amounts of non-combustible impurities, as, for example, sodium sulfate and sodium hydroxid. The presence of these non-combustible impurities may cause the resin to be cloudy, to absorb water, and to turn white when exposed to water, and therefore renders it less valuable for many of the purposes for which it is used in the arts. It is, therefore, very desirable that these impurities be removed as completely as possible.

It has been found that in this washing of the neutralized naphtha after polymerization the water tends to form an emulsion from which the water separates only very slowly. In some cases it is necessary to allow the mixture of water and naphtha to stand for five or six days before even approximately complete separation occurs.

I have discovered that if a strong solution of sodium chlorid in water is used for washing the neutralized naphtha, a separation of the wash solution from the naphtha takes place much more rapidly than when water alone is used for the washing. When a strong solution of sodium chlorid is used for washing the neutralized naphtha, the formation of emulsions of the wash solutions in the naphtha is decreased and substantially complete separation of the wash solution from the naphtha is quickly secured. I have found that by employing a sodium chlorid solution containing about 20% by weight of sodium chlorid the time required for settling, after the washing operation, is greatly reduced below the time required when a weak sodium chlorid solution is used.

As an example illustrating this invention I have used 100 gallons of a 20% sodium chlorid solution in water for washing a 3000 gallon settling tank charge of polymerized oil that had been neutralized with sodium hydroxid. During the washing operation the mixture is thoroughly agitated and is then allowed to settle and the salt solution is drawn off.

The washing with the strong salt solution usually prevents an emulsion from forming and completely removes non-combustible or ash forming impurities. If necessary, the mixture, after the first treatment with the 20% solution, may be again washed with about 600 gallons of a 3% sodium chlorid solution in the same way. After drawing off this sodium chlorid solution the mixture can be washed with about the same amount of water. In some cases the 20% sodium chlorid solution is sufficient to reduce the ash content of the oil so as to secure satisfactory results.

It is to be understood that the concentration of the salt solution may be somewhat varied, but I have found a 20% solution to be quite satisfactory. Some of the advantages gained by this invention are:—the time of the washing operation is greatly reduced; the line of demarcation upon settling is distinct; and the loss of material is decreased.

I claim:

1. In the process of producing resin from naphtha, the step which consists in washing said naphtha, after polymerization and neutralization of the same, with a solution of sodium chlorid containing about 20% sodium chlorid by weight.

2. In the process of producing resin from naphtha, the step which consists in washing said naphtha, after polymerization and neutralization of the same, with a solution of sodium chlorid containing about 20% sodium chlorid by weight, said solution being about 3% by volume of said naphtha.

3. In the process of producing resin from naphtha, the step which consists in washing said naphtha, after polymerization and neutralization of the same, with a solution of sodium chlorid containing about 20% sodium chlorid by weight, settling, and washing with salt solution containing about 3% salt by weight.

4. In the process of producing resin from naphtha, the step which consists in washing said naphtha, after polymerization and neutralization of the same, with a solution of sodium chlorid containing about 20% sodium chlorid by weight, settling, and washing with salt solution containing about 3% salt by weight, said latter solution being about 20% by volume of said naphtha.

In testimony whereof I affix my signature.

STUART P. MILLER.